(12) United States Patent
Balastre et al.

(10) Patent No.: US 11,547,113 B2
(45) Date of Patent: Jan. 10, 2023

(54) LIQUID POLYMER SUSPENSIONS

(71) Applicant: RHODIA OPERATIONS, Paris (FR)

(72) Inventors: Marc Balastre, Paris (FR); Florent Pinot, Colombes (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/438,817

(22) PCT Filed: Nov. 7, 2013

(86) PCT No.: PCT/EP2013/073302
§ 371 (c)(1),
(2) Date: Apr. 27, 2015

(87) PCT Pub. No.: WO2014/072429
PCT Pub. Date: May 15, 2014

(65) Prior Publication Data
US 2015/0250165 A1   Sep. 10, 2015

(30) Foreign Application Priority Data
Nov. 8, 2012   (FR) ..................... 12 02998

(51) Int. Cl.
*A01N 25/04* (2006.01)
*C08L 5/00* (2006.01)
*C08L 5/04* (2006.01)
*C08L 1/28* (2006.01)
*C08L 33/02* (2006.01)
*C08L 33/26* (2006.01)

(52) U.S. Cl.
CPC ............ *A01N 25/04* (2013.01); *C08L 1/284* (2013.01); *C08L 5/00* (2013.01); *C08L 5/04* (2013.01); *C08L 33/02* (2013.01); *C08L 33/26* (2013.01)

(58) Field of Classification Search
None
See application file for complete search history.

(56) References Cited

U.S. PATENT DOCUMENTS

| | | | |
|---|---|---|---|
| 3,258,326 A | 6/1966 | Rabussier | |
| 3,519,413 A * | 7/1970 | Alexandre | C05B 1/04 516/78 |
| 4,381,947 A | 5/1983 | Pellico | |
| 4,883,536 A * | 11/1989 | Burdick | C08J 3/03 106/162.8 |
| 5,489,638 A * | 2/1996 | Burdick | C08J 3/03 162/164.1 |
| 5,596,084 A | 1/1997 | Sanderson et al. | |
| 6,224,734 B1 * | 5/2001 | Kober | C07D 295/037 205/74 |
| 7,476,646 B1 * | 1/2009 | Miles | A01N 33/12 504/189 |
| 8,501,667 B2 * | 8/2013 | Ishihara | A01N 47/36 504/122 |
| 2006/0018968 A1 * | 1/2006 | Melbouci | A61K 8/39 424/488 |
| 2006/0089291 A1 * | 4/2006 | Hall | A61K 8/442 510/505 |
| 2007/0135312 A1 * | 6/2007 | Melbouci | C09K 8/035 507/214 |
| 2007/0240366 A1 * | 10/2007 | Ota | C09G 1/02 51/298 |
| 2008/0063708 A1 * | 3/2008 | Perlman | A61K 9/1652 424/465 |
| 2009/0298695 A1 * | 12/2009 | Wu | A01N 25/10 504/206 |
| 2010/0210002 A1 * | 8/2010 | McCaffrey | A01G 33/00 435/257.1 |
| 2011/0020457 A1 * | 1/2011 | Panyam | A61K 9/5161 424/499 |
| 2011/0054042 A1 * | 3/2011 | Wu | A01N 25/04 514/772.4 |
| 2011/0152302 A1 * | 6/2011 | Razzak | A61K 9/0017 514/275 |
| 2011/0182987 A1 * | 7/2011 | Bawa | A61K 9/209 424/464 |
| 2012/0285694 A1 * | 11/2012 | Morvan | C09K 8/584 166/309 |
| 2013/0079228 A1 * | 3/2013 | Freed | A01N 25/02 504/206 |
| 2013/0079394 A1 * | 3/2013 | Delaveau | A01N 43/16 514/457 |

FOREIGN PATENT DOCUMENTS

| | | | |
|---|---|---|---|
| WO | 96/11230 A1 | 4/1996 | |
| WO | WO-2009015431 A1 * | 2/2009 | ............ A01G 13/02 |
| WO | WO-2011036053 A1 * | 3/2011 | ............ A01N 25/04 |

OTHER PUBLICATIONS

Saha et al, hydrocolloids as thickening and gelling agents in food: critical review, journal food sci technol, 47 (6), 587-597 (Year: 2010).*
A. Srivastava, et al., "Alginates: a review of compositional aspects for dental applications.", Trends in Biomaterials and Artificial Organs, Jan. 1, 2012, XP55098202, Retrieved from the Internet: url: http://www.thefreelibrary.com/_/print/PrintArticle.aspx?id=304842702 [retrieved on Apr. 10, 2015].
Anonymous: "Botany online: Cell Wall—Cell Walls of Algae", Jan. 1, 2004, XP055098294, Retrieved from the Internet: url: http://www.biologie.uni-hamburg.de/b-online/e26/26d.htm [retrieved on Jan. 24, 2014] "structural components of the cell walls of algae".

* cited by examiner

*Primary Examiner* — Stefanie J Cohen
(74) *Attorney, Agent, or Firm* — Osha Bergman Watanabe & Burton LLP

(57) ABSTRACT

The present invention concerns a suspension of a polymer comprising, in addition to said polymer,
a) a liquid medium;
b) a monovalent cation salt;
c) an alginate.

15 Claims, No Drawings

LIQUID POLYMER SUSPENSIONS

This application is a U.S. national phase entry under 35 U.S.C. § 371 of International Application No. PCT/EP2013/073302, filed on Nov. 7, 2013, which claims the priority of French Application No. 12 02998, filed on Nov. 8, 2012. The entire contents of these applications are being incorporated herein by reference for all purposes.

The present invention relates to the field of liquid polymer suspensions.

Polymers and, in particular polysaccharides, such as, for example, galactomannans, cellulose-based polymers, starch and derivatives thereof, or else synthetic polymers, are commercially available compounds which are of use in many applications, for example as ingredients in food products, cosmetic compositions, agricultural compositions or else in fracturing fluids used for oilfield applications.

In a certain number of applications, the polymer is used in the form of a dry powder which is added to an aqueous medium and dissolved to form a viscous aqueous solution.

For other applications, it is, on the contrary, necessary to disperse the polymer, without it dissolving in a liquid medium, and to maintain a homogeneous suspension of this polymer, capable of remaining stable over a wide temperature range and/or for a certain storage period.

The present invention relates to this second type of formulation, in which a polymer is present in dispersed form in a liquid medium.

Moreover, it is also advantageous, generally, to prepare liquid polymer suspensions containing high concentrations of dispersed polymer, in particular for economic reasons (in particular for reducing the weight of the compositions and, consequently, the transportation costs thereof), the concentrated formulation then being diluted to the desired concentration by the final user.

In the field of agricultural compositions for example, it is generally sought to obtain concentrated formulations of polymer in dispersed form which are homogeneous, which exhibit substantially no phase separation (sedimentation, syneresis, etc) and which are flowable, so as to allow easy dilution by weight by the farmer and to make it possible to obtain a diluted product in which all the constituents are correctly dispersed and in an appropriate amount.

This approach can nevertheless be difficult to implement in practice. This is because concentrated formulations of polymer in dispersed form, for example concentrated suspensions of polysaccharides in dispersed form, can have a tendency to develop a high viscosity (resulting in particular from the partial or total hydration of said polysaccharide) and to consequently be difficult to handle.

One of the objectives of the invention is to provide liquid, in particular aqueous, polymer suspensions (in particular liquid polymer suspensions containing high concentrations of dispersed polymer) which are stable over a wide temperature range (see CIPAC (Collaborate International Pesticides Analytical Council) *tests of agrochemical formulations carried out at 0° C. for 1 week, ambient temperature for 1 year and 54° C. for 2 weeks*) and which can be stored for relatively long periods.

In the field of agricultural compositions, for example, polymers can be added to the formulations as anti-drift agents and/or as anti-rebound agents. In particular, drift-limiting agents (high-molecular-weight polymers of the type polyacrylamide, polyethylene glycol (PEG), polyvinylpyrrolidone, polysaccharide, guar type, etc) are known to reduce the amount of fine droplets generated by atomization of the agricultural composition. These polymers are in particular useful when the agricultural compositions are applied by spraying. Indeed, the spraying of aqueous formulations can generate a spray cloud in which the very small droplets (<150 μm) are carried by the wind and/or evaporated and do not reach their targets, this phenomenon being called drift or entrainment. Drift represents a considerable part of the wastage inherent in applications by spraying and presents a preoccupation in terms of public health and the environment.

The use of galactomannans (in particular of guar or derivatives thereof) in (phytosanitary or fertilizing) agricultural compositions is also known to increase, in addition, the anti-rebound effect in particular on leaves so as to limit losses during droplet impact.

For these reasons, there is therefore a continual value for liquid suspensions of a polymer, in particular liquid polymer suspensions containing high concentrations of dispersed polymer, which are easy to handle, which have good storage stability, and which disperse appropriately after dilution in water.

The term "easy to handle" or "flowable" is intended to denote compositions of suitable viscosity, for example greater than 300 cP and less than 10 000 cP measured at 20 rpm and at 20° C. according to the standardized CIPAC test MT 192.

The term "good storage stability" is intended to denote compositions which remain homogeneous (i.e. which exhibit substantially no phase separation (sedimentation, syneresis, etc)) over time, in particular which remain substantially homogeneous when they are stored for at least one week at 0° C., or for at least 2 weeks at 54° C. (standardized CIPAC tests MT 39.3 and MT 46.3).

The term "suitable dispersion" or "good dispersion" is intended to denote a dispersion after dilution in water (CIPAC standard waters A or D) which is homogeneous (i.e. which exhibits substantially no phase separation (sedimentation, syneresis, etc)) over time, in particular which remains substantially homogeneous when it is stored for 30 minutes in a water bath thermostatted at 30° C., preferably for 2 hours in a water bath thermostatted at 30° C. and ideally for 24 hours in a water bath thermostatted at 30° C. (adaptation of CIPAC test MT180). Such a dispersion must in particular make it possible to provide good properties for use of the dispersed polymer. For example, in the field of agricultural compositions in which the dispersed polymer would be an anti-rebound and/or anti-drift agent, a suitable dispersion is a dispersion which enables said polymer to actually exhibit anti-rebound and/or anti-drift properties.

Moreover, in a certain number of applications, the liquid polymer suspensions may also comprise a monovalent cation salt.

In particular, in the field of agricultural compositions, the formulations may contain a monovalent cation salt, in particular an ammonium salt.

By way of illustration, the compositions may for example contain ammonium sulfate (AMS), this salt often being used to increase the efficiency of herbicidal agents, for example glyphosates. AMS is in particular advantageous for softening water hardness. AMS is also advantageous as fertilizer for providing vegetative growth.

However, the presence of salts may be prejudicial to the stability of the liquid polymer suspension and/or may have an impact on its rheology and therefore its flowability and its ability to be handled by the user.

Indeed, the suspending and/or rheology agents conventionally used in this field (for example xanthan, rheozan or guar gums) to prepare stable concentrated agrochemical suspensions do not make it possible to play this role in media containing a certain concentration of monovalent cation salt. Indeed, the presence of such salts, in particular in a large amount, does not make it possible to stabilize these systems. Without being bound by any theory, it may be considered that the salts doubtless prevent the hydration of these suspending and/or rheological polymers, preventing the latter from being effective as rheological stabilizer of the concentrate.

For these reasons, there is therefore also a need for liquid suspensions of a polymer, in particular liquid polymer suspensions containing high concentrations of dispersed polymer, containing a monovalent cation salt, which are easy to handle, which have good storage stability, and which disperse appropriately after dilution in water.

Given that, the higher the saline concentration (in particular of monovalent cation salt), the more difficult it is to provide homogeneous suspensions which remain stable even after storage, there is also a need for concentrated liquid polymer suspensions (i.e. containing high concentrations of dispersed polymer) containing in particular a large amount of monovalent cation salt, for example monovalent cation salt contents greater than 20% by weight, for example greater than 30% by weight, for example greater than 32% by weight, relative to the total weight of the suspension Compositions comprising both guar and ammonium sulfate are known from document WO 2011/028286. In order to obtain good stability of the suspension during storage, it has been necessary to add thereto a suspending agent, in this particular case fumed silica, and, as a hydration retarder, guar and ammonium sulfate. Despite this, the ammonium sulfate concentrations of the suspensions described in said document have a very significant impact on the stability and the viscosity of the formulation and remain relatively low, about 26%.

The effect of guar as an anti-entrainment agent in aqueous spraying, in particular under prolonged spraying conditions (comprising a high shear), is also known from EP 660 999-B1. The compositions described in said document do not contain ammonium salt.

It has been discovered that the addition of a polysaccharide of alginate type, and in particular a sodium alginate or an ammonium alginate, makes it possible to maintain polymers in suspension in a saline solution (i.e. in a solution containing a monovalent cation salt), in particular when the concentration of the salt is high, and this being stably over time.

In particular, it has been discovered that the addition of a polysaccharide of sodium alginate or ammonium alginate type to an aqueous saline solution (i.e. to a solution containing a monovalent cation salt) makes it possible to maintain polymers (in particular solid particles of polysaccharides of guar type and derivatives, cellulose derivatives, or else synthetic polymers) homogeneously in suspension, under prolonged storage conditions, these polymers being sparingly hydrated or not hydrated in such a medium.

Thus, a subject of the present invention, according to a first of its aspects, is a suspension of a polymer comprising, in addition to said polymer,
a) a liquid medium;
b) a monovalent cation salt;
c) an alginate.

The invention also makes it possible to provide a stable suspension comprising particles both of active ingredients and of polymers in suspension (for example polysaccharide of guar type and derivatives, cellulose derivatives, or else synthetic polymers).

The suspension may be an extemporaneous adjuvant composition for phytosanitary or fertilizing compositions (generally known as tank-mix composition).

Thus, according to another of its aspects, the present invention relates to the use of a suspension as previously defined as an extemporaneous adjuvant of an agricultural composition intended to be applied to a field.

Liquid Medium

For the purposes of the present invention, the term "liquid medium" denotes a medium which is in the liquid phase at a temperature of 25° C. and at a pressure of one atmosphere. The liquid medium may be a non-aqueous liquid medium or an aqueous liquid medium.

According to one embodiment, the liquid medium may be an aqueous liquid medium.

For the purposes of the present invention, the term "aqueous medium" denotes a single-phase liquid medium which contains more than a trace of water, typically, the liquid medium contains more than 0.1 part by weight (pbw) of water, relative to 100 parts by weight of the aqueous medium.

More generally, the aqueous medium comprises, on the basis of 100 parts by weight of the aqueous medium, an amount of water of approximately 5 parts by weight, even more particularly an amount of water greater than 10 parts by weight.

The aqueous medium may optionally also comprise other water-miscible or water-soluble constituents dissolved in the aqueous medium.

For the purposes of the present invention, the term "water-miscible" means miscible in any proportion with water.

By way of example, the water-miscible organic liquids include ($C_1$-$C_6$) alcohols such as methanol, ethanol and propanol, and ($C_1$-$C_6$) polyols such as glycerol, ethylene glycol, propylene glycol and diethylene glycol.

According to one embodiment, the liquid medium consists mainly of water, or even is water.

Alginate

According to one embodiment, the alginate may be selected from sodium alginate and ammonium alginate. It may in particular be sodium alginate.

Alginates of this kind are in particular available from the company Faravelli, for example under the references Sodium Alginate Food Grade E401 or 990.079, from the company Biochemica Applichem, for example under the reference A3249, and from the company Dupont/Danisco under the reference Grinsted Alginate FD 125.

Monovalent Cation Salt

According to one embodiment, the monovalent cation salt may be selected from the salts containing the elements N, P, K.

According to one embodiment, the monovalent cation salt may be selected from:
  ammonium salts, such as ammonium sulfate, ammonium chloride, ammonium nitrate, ammonium acetate, ammonium formate, ammonium oxalate, ammonium carbonate, ammonium thiosulfate, ammonium phosphate, ammonium thiocyanate, ammonium polyphosphates, such as ammonium metaphosphate, ammonium hexametaphosphate, ammonium propionate, ammonium dihydrogen phosphate, or mixtures thereof,
  potassium salts, such as tetrapotassium pyrophosphate, potassium phosphate, potassium polyphosphates, such as potassium tripolyphosphate, potassium chloride, potassium iodide, potassium sulfate, or mixtures thereof;

sodium salts, such as sodium carbonate, sodium citrate, or mixtures thereof; and mixtures thereof.

The monovalent cation salt may be, in particular, selected from the following compounds: ammonium sulfate, ammonium polyphosphate, ammonium propionate, ammonium nitrate, ammonium phosphate, ammonium dihydrogen phosphate, ammonium hexametaphosphate, tetrapotassium pyrophosphate, potassium phosphate, sodium carbonate, potassium sulfate, and mixtures thereof.

According to one embodiment, the monovalent cation salt is an ammonium salt, preferably ammonium sulfate.

The monovalent cation salt present in the composition of the invention, for example such as ammonium sulfate, may make it possible to increase the effectiveness of herbicidal agents (for example glyphosates) in particular by contributing to softening the water hardness.

The monovalent cation salt present in the composition of the invention, for example such as ammonium sulfate, may also be advantageous as fertilizer for providing vegetative growth.

Polymer

In the context of the present invention, the polymer suspended in the compositions of the invention may be selected from polysaccharides, for example selected from galactomannans, such as guars, including guar derivatives such as hydroxypropyl guar or carboxymethylhydroxypropyl guar, xanthans, polyfructoses such as levan, starches, including starch derivatives, such as amylopectin and celluloses, including cellulose derivatives, such as methylcellulose, ethylcellulose, carboxymethylcellulose, carboxymethylhydroxyethylcellulose, hydroxyethylcellulose, cellulose acetate, hydroxybutylmethylcellulose, hydroxypropylcellulose, hydroxypropylmethylcellulose, cellulose acetate butyrate, and cellulose acetate propionate, acacia, agar, carrageenan, dammar, dextran, dextrin, gelatin, benzoin gum, jalap resin, karaya gum, kelp, locust bean gum, maltodextrin, olibanum, pectin, propylene glycol alginate, sandarac gum, sodium carboxymethyl dextran, gum tragacanth, polyacylamide, polyvinylpyrolidone, and mixtures thereof.

According to one embodiment, this polymer may in particular be selected from polyacrylamide; polyvinylpyrrolidone; polysaccharides, for example selected from galactomannans, such as guars, including guar derivatives, polyfructoses such as levan, starches, including starch derivatives, such as amylopectin and celluloses, including cellulose derivatives, such as methylcellulose, ethylcellulose, carboxymethylcellulose, hydroxyethylcellulose, cellulose acetate, cellulose acetate butyrate, cellulose acetate propionate, and mixtures thereof.

The polymer may in particular be an anti-rebound and/or anti-drift agent.

According to one particular embodiment, the polymer may be a galactomannan, in particular selected from modified galactomannans, including polymers derived from guar, such as carboxymethyl guar, carboxymethylhydroxypropyl guar, cationic hydroxyalkyl guar (including hydroxyethyl guar, hydroxypropyl guar, hydroxybutyl guar), neutral hydroxyalkyl guar (including hydroxyethyl guar, hydroxypropyl guar, hydroxybutyl guar), carboxyalkyl guar (including carboxymethyl guar, carboxylpropyl guar, carboxybutyl guar), hydroxyethylated, hydroxypropylated and carboxymethylated guaran derivatives, hydroxyethylated and carboxymethylated carubin derivatives and hydroxypropylated and carboxymethylated cassia gum derivatives.

According to one embodiment of the present invention, the polymer may be a non-derived galactomannan polysaccharide, more generally a non-derived guar gum.

More generally, the polysaccharide may be a derived galactomannan polysaccharide which is substituted on one or more sites of the polysaccharide with a substituent group which is selected, independently for each site, from the group consisting of cationic, nonionic and anionic substituent groups.

According to one embodiment, the polymer may be a galactomannan polysaccharide derivative, more generally the polymer may be a derived guar.

Thus, according to one embodiment, the polymer may be a galactomannan, for example a guar, including guar derivatives. It may in particular be selected from guar and derivatives thereof, in particular neutral or native guar and hydroxyproxylated and/or cationic derivatives thereof.

By way of example of derived guars, mention may in particular be made of hydroxypropyltrimethylammonium guar, hydroxypropyllauryldimethylammonium guar, hydroxypropylstearyldimethylammonium guar, hydroxypropyl guar, carboxymethyl guar, guar with hydroxypropyl and hydroxypropyltrimethylammonium groups, guar with carboxymethylhydroxypropyl groups, and mixtures thereof.

By way of example of guars suitable for the invention, mention may in particular be made of the compounds sold under the references Jaguar HP-8, AgRHO DR2000, AgRHO DR2010, Jaguar C14S, Jaguar C17, Jaguar Excel, Jaguar HP-105, Jaguar HP-120, Jaguar 308NB and Jaguar C162 by the company Solvay (Rhodia).

According to another embodiment, the polymer may be a cellulose or a derivative thereof. By way of example, mention may be made of the hydroxyethylcellulose sold under the reference Natrosol type 250 HR by the company Ashland.

According to another embodiment, the polymer may be a polyacrylamide (homopolymer or copolymer). By way of example, mention may be made of Polytex 363 sold by the company Exacto Inc. or else Cgel 100 sold by the company SNF.

According to another embodiment, the polymer may be a polyvinylpyrrolidone (homopolymer or copolymer).

Advantageously, the suspension according to the invention comprises from 0.01% to 5% by weight of alginate relative to the total weight of the suspension, preferably from 0.05% to 2.5% by weight and more preferably from 0.1% to 1.5% by weight, for example at least 0.5% by weight.

The suspension advantageously comprises between 10% and 80% by weight of monovalent cation salt relative to the total weight of the suspension, preferably from 20% to 60% by weight and more preferably from 30% to 45% by weight.

According to one embodiment, the monovalent cation salt content may be greater than or equal to 31% by weight relative to the total weight of suspension, for example greater than or equal to 33% by weight, for example greater than or equal to 35% by weight, for example between 31% and 40% by weight, for example between 33% and 40% a by weight, and for example between 35% and 40% by weight.

The amount of polymers, in particular in the form of solid particles, that the suspension may contain depends on the amount of monovalent cation salt. The weight ratio between the monovalent cation salt and the polymer, in particular in the form of solid particles, may be in particular between 800 and 0.5, preferably between 200 and 2, more preferably between 100 and 4 and even more preferably between 30 and 7.

According to one embodiment, the suspension according to the invention may comprise:
- at least 30% by weight, relative to the total weight of the suspension, of a monovalent cation salt, for example of an ammonium salt, preferably of ammonium sulfate,
- at least 1% by weight, relative to the total weight of the suspension, of the polymer,
- from 0.5% to 2% by weight, relative to the total weight of the suspension, of the alginate.

According to one embodiment, the suspension may comprise:
- at least 31% by weight, relative to the total weight of the suspension, for example from 33% to 40% by weight, for example from 35% to 40% by weight, of a monovalent cation salt, for example of an ammonium salt, preferably of ammonium sulfate,
- at least 1.5% by weight, for example at least 2% by weight, relative to the total weight of the suspension, of the polymer,
- from 0.5% to 1.5% by weight, relative to the total weight of the suspension, of the alginate.

According to one embodiment, the suspension may comprise:
- from 33% to 40% by weight, relative to the total weight of the suspension, for example from 35% to 40% by weight, of an ammonium salt, preferably of ammonium sulfate,
- at least 1.5% by weight, for example at least 2% by weight, relative to the total weight of the suspension, of the polymer, preferably of a cellulose or of a derivative thereof,
- from 0.5% to 1.5% by weight, relative to the total weight of the suspension, of the alginate, preferably of sodium alginate.

According to one embodiment, the suspension may comprise:
- from 33% to 40% by weight, relative to the total weight of the suspension, for example from 35% to 40% by weight, of an ammonium salt, preferably of ammonium sulfate,
- at least 1.5% by weight, for example at least 2% by weight, relative to the total weight of the suspension, of the polymer, preferably of a galactomannan or of a derivative thereof,
- from 0.5% to 1.5% by weight, relative to the total weight of the suspension, of the alginate, preferably of sodium alginate.

According to one embodiment, the suspension may comprise:
- from 33% to 40% by weight, relative to the total weight of the suspension, for example from 35% to 40% by weight, of an ammonium salt, preferably of ammonium sulfate,
- at least 1.5% by weight, for example at least 2% by weight, relative to the total weight of the suspension, of the polymer, preferably of a polyacrylamide (homopolymer or copolymer),
- from 0.5% to 1.5% by weight, relative to the total weight of the suspension, of the alginate, preferably of sodium alginate.

According to one embodiment, the suspension may comprise:
- from 33% to 40% by weight, relative to the total weight of the suspension, for example from 35% to 40% by weight, of an ammonium salt, preferably of ammonium sulfate,
- at least 1.5% by weight, for example at least 2% by weight, relative to the total weight of the suspension, of the polymer, preferably of a polyvinylpyrrolidone (homopolymer or copolymer),
- from 0.5% to 1.5% by weight, relative to the total weight of the suspension, of the alginate, preferably of sodium alginate.

The suspension according to the invention may also advantageously comprise one or other additive such as preservatives, antifoams, humictants, surfactants, etc.

It may likewise also comprise fertilizing agents and/or fertilizers such as, for example, urea and/or trace elements or micronutrients (such as, for example, Zn, Mn, Cu, Fe or Co).

According to one embodiment, the suspension of the invention may comprise less than 10% by weight, relative to the total weight of the suspension, of fumed silica, preferably less than 5% by weight, for example less than 2% by weight, for example less than 1% by weight, for example less than 0.5% by weight. In particular, it may be substantially devoid of fumed silica.

According to one embodiment, the suspension of the invention may comprise less than 10% by weight, relative to the total weight of the suspension, of xanthan gum, preferably less than 5% by weight, for example less than 2% by weight, for example less than 1% by weight, for example less than 0.5% by weight. In particular, it may be substantially devoid of xanthan gum.

According to one embodiment, the pH of the suspension of the invention may be between 4 and 10, for example between 5 and 9.

Surfactants

According to one embodiment, the suspension according to the invention may additionally comprise one or more surfactants.

For the purposes of the invention, the term "surfactant" is intended to denote a compound capable of lowering the surface tension of water, and more generally a compound selected from one of the following five categories: cationic, anionic, amphoteric, zwitterionic and nonionic surfactants, and also mixtures thereof.

According to one particular embodiment, the suspension of the present invention comprises a cationic surfactant.

The suitable cationic surfactants are known in the prior art and comprise, for example, amine salts, for instance ethoxylated tallow amine, cocoalkylamine and oleylamine, quaternary ammonium compounds such as cetyltrimethylammonium bromide, myristyltrimethylammonium bromide, stearyl dimethyl benzyl ammonium chloride, lauryl/myristryl trimethyl ammonium, methosulfate, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, cocoyl hydroxyethylimidazolinium, and mixtures thereof.

According to another particular embodiment, the suspension of the present invention comprises an anionic surfactant.

The suitable anionic surfactants are known in the prior art and comprise, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, dilauryl sulfate, diethanolamine laureth sulfate, sodium lauryl sulfate monoglyceride, sodium lauryl sulfate, sodium laureth sulfate, potassium lauryl sulfate, potassium laureth sulfate, sodium lauryl sarcosinate, lauryl sarcosine lauroyl sarcosinate, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, triethanolamine lauryl sulfate, triethanolamine lauryl sulfate, monoethanolamine cocoyl sulfate, monoethanolamine lauryl sulfate, sodium tridecylbenzenesulfonate, sodium dodecylbenzenesulfonate, and mixtures thereof.

According to another particular embodiment, the suspension of the present invention comprises an amphoteric surfactant.

The suitable amphoteric surfactants are known in the prior art, and comprise widely described surfactants, for instance aliphatic secondary and tertiary amine derivatives, in which the aliphatic radical may be linear or branched and in which one of the aliphatic substituents contains from approximately 8 to approximately 18 carbon atoms and another contains a water-solubilizing anionic group such as carboxyl, sulfonate, sulfate, phosphate or phosphonate. According to another particular embodiment, the amphoteric surfactant comprises at least one compound selected from cocoamphoacetate, cocoamphodiacetate, lauroamphoacetate and lauroamphodiacetate.

According to another particular embodiment, the suspension of the present invention comprises a zwitterionic surfactant.

The suitable zwitterionic surfactants are known in the prior art, and comprise, for example, widely described surfactants, for instance aliphatic quaternary ammonium, phosphonium and sulfonium derivatives, in which the aliphatic radicals may be a straight-chain or branched-chain radical, and in which one of the aliphatic substituents contains from approximately 8 to approximately 18 carbon atoms and another contains an anionic group such as a carboxylic, sulfonate, sulfate, phosphate or phosphonate group.

Specific examples of suitable zwitterionic surfactants comprise alkyl betaines, such as coco dimethyl carboxymethyl betaine, lauryl dimethyl carboxymethylcellulose betaine, lauryl dimethyl alpha-carboxyethyl betaine, cetyl dimethyl carboxymethyl betaine, lauryle bis(2-hydroxyethyl) carboxymethylcellulose betaine, stearyl bis(2-hydroxypropyl)carboxymethyl betaine, oleyl dimethyl-gamma-carboxypropyl betaine, lauryl bis(2-hydroxypropyl)-alpha-carboxyethyl betaine, alkyl amidopropyl betaines, alkyl sultaines, such as coco dimethyl sulfopropyl betaine, methyl stearyldi sulfopropyl betaine, lauryl dimethyl sulfoethyl betaine, lauryl bis(2-hydroxyethyl) sulfopropyl betaine, and alkylamidopropylhydroxy sultaines.

According to another particular embodiment, the suspension of the present invention comprises a nonionic surfactant.

The suitable nonionic surfactants are known in the prior art and comprise, for example, long-chain alkylglucosides which have alkyl groups containing approximately 8 carbon atoms to approximately 22 carbon atoms, coconut fatty acid monoethanolamides, for instance cocamide MEA, coconut fatty acid diethanolamides, alcohol alkoxylates, and mixtures thereof.

According to one preferential embodiment, the suspension of the present invention comprises a mixture of two or more surfactants selected from cationic surfactants, anionic surfactants, amphoteric surfactants, zwitterionic surfactants, nonionic surfactants, and mixtures thereof.

Particularly, according to one embodiment of the present invention, the surfactant used in the suspension according to the invention may be selected from the following compounds:

(i) alkyl betaines and alkyl (amidoalkyl) betaines, (ii) amines or ether amines, comprising at least one hydrocarbon-based radical containing from 2 to 24 carbon atoms, which are optionally polyalkoxylated, (iii) acid or nonacid forms of phosphate monoesters or diesters, which are optionally polyalkoxylated, (iv) alkylmonoglycosides or alkylpolyglycosides, and/or (v) alcohols, comprising at least one hydrocarbon-based radical containing from 2 to 24 carbon atoms, which are optionally polyalkoxylated.

For example, the compound (i) may be selected from formulae below:

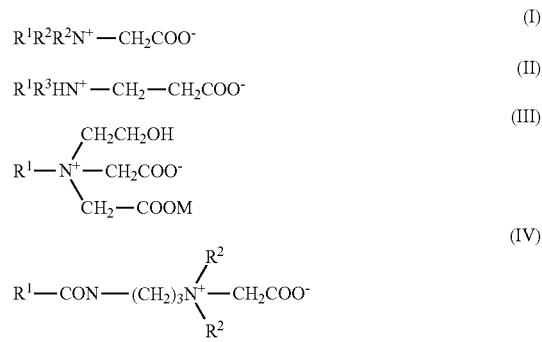

in which:

$R^1$ represents a linear or branched alkyl group containing 3 to 30 carbon atoms, preferably 3 to 20 carbon atoms, such as propyl, dodecyl, hexadecyl, tetrahexadecyl, octyl, or mixtures thereof, or an alkamide group, for instance dodecanamide:

$R^2$, which may be identical or different, represent an alkyl radical, preferably a methyl radical, $R^3$ represents a hydrogen atom or a —$CH_2COOM$ radical or an alkyl radical:

M represents an alkali metal, preferably sodium.

These compounds, which can be used in the invention as principal surfactants, are commercially available products and are sold by the company Solvay (Rhodia) under the trade names Mirataine® and Wettem®.

Advantageously, these commercial products may be used as they are, without a prior treatment, for reducing the amount of salt, for example (sodium chloride in particular).

For example, the compound (ii) may be selected from amines comprising at least one saturated or unsaturated, linear or branched radical containing 2 to 24 carbon atoms, preferably 8 to 18 carbon atoms, optionally comprising 2 to 30 oxyalkylene, preferably oxyethylene, units, or mixtures thereof; or from ether amines comprising at least one saturated or unsaturated, linear or branched radical having from 6 to 24 carbon atoms, preferably 8 to 20 carbon atoms, optionally comprising 2 to 30 oxyalkylene, preferably oxyethylene, units, or mixtures thereof.

More particularly, the ether amines correspond to the formula below:

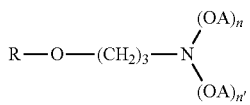

in which,
R represents a saturated or unsaturated, linear or branched hydrocarbon-based radical having from 6 to 24 carbon atoms, preferably from 8 to 20 carbon atoms;
OA, which may be identical or different from one unit to another and from one branch to another, represent an oxyethylene, preferably oxypropylene, unit; and
n and n', which may be identical or different, represent an average number between 1 and 30.

Of the examples of these amines, mention may in particular be made of amines derived from coconut and containing 5 oxyethylene (OE) units, oleyl amines containing 5 OE, tallow-derived amines containing 10 OE, and the ether amines corresponding to the formula above, in which the R radical is an alkyl radical containing from 12 to 15 carbon atoms, the number of OE units being between 20 and 30.

For example, the compound (iii) may be selected from the acid or nonacid forms of phosphate monoesters or diesters, which are optionally polyalkoxylated, having the following formula:

$$(AO)_{3-m}P(=O)(OM)_m$$

in which:
A, which may be identical or different, represent an $R'^1$—O($CH_2$—$CHR'^2$—O)$_n$ group in which:
$R'^1$, which may be identical or different, represent a saturated or unsaturated, linear or nonlinear, $C_6$-$C_{20}$, preferably $C_8$-$C_{18}$ alkyl hydrocarbon-based group;
$R'^2$, which may be identical or different, represent a hydrogen atom or a methyl or ethyl radical, preferably a hydrogen atom;
n is an average number of units between 0 and 10, preferably between 2 and 10;
M, which may be identical or different, represent a hydrogen atom, an alkali or alkaline-earth metal, a radical of the $N(R^3)_4^+$ type in which the $R^3$ radicals, which may be identical or different, represent a hydrogen atom or a saturated or unsaturated, linear or nonlinear $C_1$ to $C_6$ hydrocarbon-based radical optionally substituted with a hydroxyl group, m is an integer between 1 and 2.

The compound (iii) may be in the form of a monoester, a diester, or a mixture of these two esters.

For example, the compound (iv) may be selected from octylglycoside, octylpolyclycoside, decylglycoside, decylpolyglycoside, or mixtures thereof.

According to one even more advantageous embodiment, the surfactant used in the suspension according to the invention may be selected from the following compounds:
(i) alkyl betaines and alkyl (amidoalkyl) betaines,
(ii) acid or nonacid forms of phosphate monoesters or diesters, which are optionally polyalkoxylated, and
(iii) alcohols comprising at least one hydrocarbon-based radical containing from 2 to 24 carbon atoms, which are ethoxylated.

Uses

The suspension of the invention can be used as an extemporaneous adjuvant of a diluted agricultural composition intended to be applied to a field.

For the purposes of the present invention, an agricultural composition is a composition comprising at least one agricultural active ingredient, in particular selected from herbicides, fungicides, insecticides, acaricides, nematicides and/or a fertilizing agent and/or a fertilizer product.

In this respect, the suspension may be introduced into a receptacle, typically a container or a tank, so as to be diluted therein with water and optionally with other ingredients, in particular an agricultural active product or a formulation comprising such a product. The dilution may typically be 1 part of dispersion for 50 to 500 parts of water. It is typically carried out by the farmer. According to one embodiment, the suspension is first diluted by pouring it into the water, and then the active product or the formulation comprising it is added.

The diluted composition (comprising the diluting water, the dispersion and, optionally, the active product) is then spread on the field to be treated.

Thus, it is possible to carry out a process for applying an agricultural composition to a field, comprising:
a step of mixing, in a container, the suspension according to the present invention, water and at least one agricultural product, where appropriate in the form of a concentrated agricultural composition, so as to obtain a diluted agricultural composition,
a step of applying the diluted agricultural composition to the field.

The application may be carried out using any appropriate device, in particular spray and/or jet devices. The devices may, for example, be placed on the ground, placed on land vehicles such as tractors, or placed on aerial vehicles such as aeroplanes or helicopters. The amount of diluted composition applied may typically be from 10 to 2000 l/Ha, for example from 50 to 200 l/Ha. Depending on the degree of dilution, the amount of water-soluble polymer in the dispersion, and the application doses, from 9 to 1800 g/Ha, for example from 45 to 180 g/Ha of water-soluble polymer may typically be applied.

By way of illustration, the agricultural composition may in particular comprise:
by way of herbicidal active agents: Acetochlor, Acibenzolar, Acibenzolar-5-methyl, Acifluorfen, Acifluorfen-sodium, Aclonifen, alachlor, Allidochlor, Alloxydinn, Alloxydinn-sodium, Ametryn, Amicarbazone, amidochlor, Amidosulfuron, Aminocyclopyrachlor, Aminopyralid, Amitrole, Ammonium sulfamate, Ancymidol, anilofos, Asulam, atrazine, azafenidin, Azimsulfuron, Aziprotryn, beflubutamid, benazolin, benazolin-ethyl, Bencarbazone, Benfluralin, benfuresate, Bensulide, Bensulfuron, Bensulfuron-methyl, bentazone, Benzfendizone, Benzobicyclon, Benzofenap, Benzofluor, benzoylprop, bicyclopyrone, bifenox, Bispyribac, Bispyribac-sodium, Bromacil, bromobutide, Bromofenoxim, bromoxynil, Bromuron, Buminafos, Busoxinone, Butachlor, Butafenacil, butamifos, Butenachlor, butralin, Butroxydim, Butylate, Cafenstrole, carbetamide, Carfentrazone, carfentrazone-ethyl, Chlomethoxyfen, chloramben, Chlorazifop, Chlorazifop-butyl, chlorbromuron, chlorbufam, Chlorfenac, Chlorfenac-sodium, Chlorfenprop, chlorflurenol, chlorflurenol-methyl, Chloridazon, Chlorimuron, Chlorimuron-ethyl, Chlormequat chloride, Chlornitrofen, Chlorophthalim, Chlorthal-dimethyl, Chlorotoluron, Chlorsulfuron, cinidon, cinidon-ethyl, cinmethylin, Cinosulfuron, Clethodim (C10), Clodinafop, Clodinafop-propargyl, Clofencet, Clomazone, Clomeprop, Cloprop, Clopyralid (C1), Cloransulam, cloransulam-methyl, cumyluron, Cyanamnide, Cyanazine, cyclanilide, cycloate, Cyclosulfamuron, Cycloxydim (C11), Cycluron, Cyhalofop, Cyhalofop-butyl, Cyperquat, Cyprazine, Cyprazole, 2,4-D, 2,4-DB, Dalapon, Daminoziade, Dazomet, n-Decanol, Desmedipham, Desmetryn, Detosyl-pyrazolate (DTP), diallate, dicamba, Dichiobenil, Dichlorprop, Dichlorprop-P, Diclofop, Diclofop-methyl, Diclofop-P-methyl, diclosulam, Diethatyl, Diethatyl-ethyl, Difenoxuron, Difenzoquat, Diflufenican, Diflufenzopyr, Diflufenropyr-sodium, dimefuron, dikegulac-sodium, dimefuron, dimepiperate, dimethachlor (C2), Dimethametryn, Dimethenamide, Dimethenamide-P, Dimethipin, Dimetrasulfuron, dinitramine, Dinoseb, Dinoterbe, diphenamide, Dipropetryn, Diquat, Diquat-dibromide, Dithiopyr, diuron, DNOC, Eglinazine-ethyl, Endothal, EPTC, esprocarb, ethalfluralin, Ethametsulfuron, Ethametsulfuron-methyl, ethephon, ethidimuron, Ethiozin, Ethofumesate, Ethoxyfen, Ethoxyfen-ethyl, ethoxysulfuron, Etobenzanid, F-5331, dh N-[2-chloro-4-fluoro-5-[4-(3-fluoropyl)-4,5-dihydro-5-oxo-1H-tetrazol-1-yl]phenyl]-ethane sulfonamide, F-7967, dh 3-[7-Chloro-5-fluoro-2-(trifluoromethyl)-1H-benzimidazol-4-yl]-1-methyl-6-(trifluoromethyl)pyrimidine-2,4(1H,3H)-dione, Fenoprop, Fenoxaprop, Fenoxaprop-P, fenoxaprop-ethyl, Fenoxaprop-P-ethyl (C3), Fenoxasulfone, fentrazamide, Fenuron, flamprop, flamprop-M-isopropyl, flamprop-M-methyl, Flazasulfuron, Florasulam, Atrazine, fluazifop-P, fluazifop-butyl, fluazifop-P-butyl, Fluazolate, Flucarbazone, Flucarbazone-sodium, Flucetosulfuron, fluchloralin, Flufenacet (Thiafluamide), Flufenpyr, Flufenpyr-ethyl, Flumetralin, Flumetsulam, flumiclorac, flumiclorac-pentyl, Flumioxazin, Flumipropyn, fluometuron, fluorodifen, fluoroglycofen, fluoroglycofen-ethyl, flupoxam, Flupropacil, Flupropanate, Flupyrsulfuron, flupyrsulfuron-methyl-sodium, Flurenol, Flurenol-butyl, fluridone, Fluorochloridone, Fluoroxypyr, Fluoroxypyr-meptyl, flurprimidol, flurtamone, fluthiacet, fluthiacet-methyl, fluthiamide, Fomesafen, Foramsulfuron, Forchlorfenuron, Fosamine, Furyloxyfen, glufosinate, ammonium glufosinate, glyphosate, diammonium glyphosate, isopropylammonium glyphosate, potassium glyphosate, H-9201, dh O-(2,4-dimethyl-6-nitrophenyl)-O-ethyl-isopropyl phosphoramidothioate, halosafen, Halosulfuron, Halosulfuron-methyl, haloxyfop, haloxyfop-P (C4), haloxyfop-ethoxyethyl, haloxyfop-P-ethoxyethyl, haloxyfop-methyl, Haloxyfop-P-methyl, Hexazinone, HW-02, dh 1-(dimethoxyphosphoryl)ethyl(2,4-dichloro)acetate, Imazamethabenz, imazamethabenz-methyl, Imazamox (C9), Imazamox-ammonium, imazapic, Imazapyr, imazapyr-isopropylammonium, imazaquine, imazaquine-ammonium, imazethapyr, Imazethapyr-ammonium, Imazosulfuron, Inabenfide, Indanofan, Indaziflam, indoleacetic acid (1AA), 4-indol-3-ylbutyric acid (IBA), Iodosulfuron, iodosulfuron-methyl-sodium, Ioxynil, Ipfencarbazone, Isocarbamide, isopropalin, isoproturon, Isouron, Isoxaben, Isoxachlortole, Isoxaflutole, Isoxapyrifop, Kuh-043, dh 3-({[5-(Difluoromethyl)-1-methyl-3-(trifluoromethyl)-1H-pyrazol-4-yl]methyl}sulfonyl)-5,5-dimethyl-4,5-dihydro-1,2-oxazole, Karbutilate, Ketospiradox, Lactofen, Lenacil, linuron, MCPA, MCPB, MCPB-methyl, -ethyl and -sodium, mecoprop, mecoprop-sodium, Mecoprop-butotyl, Mecoprop-P-butotyl, Mecoprop-P-dimethyl-ammonium, Mecoprop-P-2-ethylhexyl, Mecoprop-P-potassium, Mefenacet, mefluidide, Mepiquat-chloride, Mesosulfuron, Mesosulfuron-methyl, Mesosulfuron-methyl-Na, mesotrione, Methabenzthiazuron, Metam, Metamifop, Metamitron, Metazachlor (C5), Metazasulfuron, methazole, Methiopyrsulfuron, Methiozolin, Methoxyphenone, Methyldymron, 1-Methylcyclopropen, Methylisothiocyanate, Metobenzuron, Metobromuron, metolachlor, S-metolachlor, metosulam, Metoxuron, Metribuzin, Metsulfuron, metsulfuron-methyl, Molinate, Monalide, monocarbamide, monocarbamide-dihydrogen sulfate, Monolinuron, Monosulfuron, Monosulfuron-ester, Monuron, MT-128, DH 6-chloro-N-[(2E)-3-chloroprop-2-en-1-yl]-5-methyl-N-phenylpyridazin-3-amine, TA-5950, dh N-[3-Chloro-4-(1-methylethyl)phenyl]-2-methylpentanamide, NGGC-011, Naproanilide, Napropamide (C6), Naptalam, NC-310, DH 4-(2,4-Dichlorobenzoyl)-1-methyl-5-benzyloxypyrazole, neburon, Nicosulfuron, Nipyraclofen, nitraline, Nitrofen, sodium nitrophenolate (mixture of isomers), Nitrofluorfen, nonanoic acid, norflurazon, Orbencarb, orthosulfamuron, Oryzalin, oxadiargyl Oxadiazon, oxasulfuron, Oxaziclomefone, Oxyfluorfen, Paclobutrazol, Paraquat, Paraquat-dichloride, pendimethalin, Pendralin, penoxsulam, Pentanochlor, Pentoxazone, perfluidone, pethoxamide, Phenisopham, Phenmedipham, Phenmedipham-ethyl, Picloram, Picolinafen, Pinoxaden, Piperophos, Pirifenop, Pirifenop-butyl, Pretilachlor, Primisulfuron, Primisulfuron-methyl, probenazole, Profluazol, Procyazine, prodiamine, Piluraline, profoxydime, Prohexadione, Prohexadione-calcium, Prohydrojasmone, Prometon, Prometryn, Propachlor, Propanil, propaquizafop, Propazine, Propham, propisochlor, Propoxycarbazone, Propoxycarbazone-Propyrisulfuron, Propyzamide, Prosulfalin, prosulfocarb, Prosulfuron, Prynachlor, Pyraclonil, pyraflufen, pyraflufen-ethyl, Pyrasulfotole, Pyrazolynate (pyrazolate), pyrazosulfuron, pyrazosulfuron-ethyl, Pyrazoxyfen, Pyribambenz, Pyribambenz-isopropyl, Pyribambenz-propyl, Pyribenzoxim, Pyributicarb sodium, pyridafol, Pyridate (C7), Pyriftalid, pyriminobac, pyriminobac-methyl, Pyrimisulfan, pyrithiobac, pyrithiobac-sodium, pyroxasulfone, Pyroxsulam, Quinclorac, quinmerac, Quinoclamine, Quizalofop, Quizalofop-ethyl, Quizalofop-P, Quizalofop-P-ethyl, Quizalofop-P-tefuryl, Rimisulfuron, Saflufenacil, Secbumeton, Sethoxydim, Siduron, simazine, simetryn, SN-106279, dh Methyl-(2R)-2-({7-[2-chloro-4-(trifluoromethyl)phenoxy]-2-naphthyl}oxy)propanoate, sulcotrione, Sulfallate (CDEC), sulfentrazone, Sulformeturon, Sulformeturon-methyl, Sulfosate (glyphosate trimesium), Sulfosulfuron, SYN-523, SYP-249, DH 1-ethoxy-3-methyl-1-oxobut-3-en-2-yl-5-[2-chloro-4-(trifluoromethyl)phenoxy]-2-nitrobenzoate, SYP-300, dh 1-[7-fluoro-3-oxo-4-(prop-2-en-1-yl)-3,4-dihydro-2H-1,4-benzoxazin-6-yl]-3-propyl-2-thioxoimidazolidine-4,5-dione, tebutam, Tebuthiuron, tecnazene, Tefuryltrione, Tembotrione, Tepraloxydime, Terbacil, Terbucarb, Terbuchlor, Terbumeton, terbuthylazine, Terbutryn, Thenylchlor, Thiafluamide, Thiazafluoron, thiazopyr, Thidiazimin, Thidiazuron, Thiencarbazone, Thiencarbazone-methyl, Thifensulfuron, Thifensulfuron-methyl, thiobencarb, Tiocarbazil, Topramezone, Tralkoxydim, Triallate, Triasulfuron, Triaziflam, Triazofenamide, Tribenuron, Tribenuron-methyl, trichloroacetic acid (TCA), Triclopyr, tridiphane, Thietazine, Trifloxysulfuron, Trifloxysulfuron-sodium, trifluralin (C8), Triflusulfuron, Triflusulfuron-methyl, Trimeturon, Trinexapac, Trinexapac-ethyl, tritosulfuron, Tsitodef, Uniconazole, Uniconazole-P, vernolate, ZJ-0862, dh 3,4-dichloro-N-{2-[(4,6-dimethoxypyrimidin-2-yl)oxy]benzyl}aniline or a mixture thereof.

For example, the herbicides may in particular be selected from N-(phosphonomethyl) glycine (glyphosate) and salts thereof, and preferably the isopropylammonium salt of N-(phosphonomethyl) glycine (glyphosate, isopropylammonium salt);

by way of fungicidal active agents: fungicidal nitrile oximes such as cymoxanil, imidazole fungicides such benomyl, carbendazime or thiophanate-methyl; triazole fungicides, for instance triadimefon; sulfenamide fungicides, for instance captan, dithiocarbamate fungicides, for instance maneb, mancozeb, or thiram; chlorinated aromatic fungicides, for instance chloroneb; dichloroaniline fungicides, for instance iprodione, strobilurin-based fungicides, for instance kresoxim-methyl, trifloxystrobin or azoxystrobin, chlorothalonil, copper salt fungicides such as copper oxychloride, sulfur, phenylamides and acylamino fungicides, for instance metalaxyl or mefenoxam;

by way of insecticidal active agents: carbamates, such as methomyl, carbaryl, carbofuran or aldicarb; organothiophosphate insecticides, for instance EPN, isofenphos, isoxathion, chlorpyrifos or chlormephos; organophosphorus insecticides, for instance terbufos, monocrotophos or terachlorvinphos; perchlorinated organic insecticides, for instance methoxychlor; synthetic pyrethrinoid insecticides such as fenvalerate, abamectin ou emamectin benzoate, neonicotinoid insecticides, for instance thiamethoxam or imidacloprid, pyrethrinoid insecticides, for instance lambda-cyhalothrin, cypermethrin or bifenthrin and oxadiazine insecticides, for instance indoxacarb, imidacloprid or fipronil;

by way of acaricidal active agents: acaricidal propynyl sulfites such as propargite; triazapentadiene acaricides such as amitraz, chlorinated aromatic acaricides such as chlorobenzilate, or tetradifan, and dinitrophenol acaricides such as binapacryl;

by way of nematicidal active agents: carbamate nematicides, for instance oxamyl;

by way of a fertilizing agent and/or fertilizer product, phosphate-based fertilizers such as ammonium diacid phosphate (MAP), diammonium phosphate (DAP), a certain number of well-known NPK fertilizer products and/or fertilizing agents containing nitrogen materials such as (anhydrous or aqueous) ammonia, ammonium nitrate, ammonium sulfate, urea, ammonium phosphates, sodium nitrate, calcium nitrate, potassium nitrate, sodium nitrate, urea-formaldehyde, metals (for example zinc, iron), ammonium phosphates, phosphorus materials such as calcium phosphates (normal phosphate and superphosphate), ammonium phosphate, ammoniacal superphosphate, phosphoric acid, superphosphoric acid, basic slag, rock phosphate, colloidal phosphate, bone phosphate, potassium materials such as potassium chloride, potassium sulfate, potassium nitrate, potassium phosphate, potassium hydroxide or potassium carbonate, calcium materials, such as calcium sulfate, calcium carbonate or calcium nitrate, magnesium materials, such as magnesium carbonate, magnesium oxide, magnesium sulfate or magnesium hydroxide, sulfur materials such as ammonium sulfate, the sulfates of other fertilizers described herein, ammonium thiosulfate, elemental sulfur (alone or included in or applied on other fertilizers); trace elements or micronutrients such as Zn, Mn, Cu or Fe, and other micronutrients discussed herein, oxides, sulfates, chlorides, and the chelates of such micronutrients (for example, zinc oxide, zinc sulfate and zinc chloride), such chelates sequestered on other supports, such as EDTA, boron materials, for instance boric acid, sodium borate or calcium borate; and molybdenum materials such as sodium molybdate.

These agricultural active compounds can exist in the form of dry powders or of liquids.

Various types of agricultural formulations can be added to the extemporaneous formulation according to the invention, depending on the various agricultural products. Mention is made, for example, of emulsifiable concentrates (ECs), dispersible concentrates (DCs), suspension concentrates (SCs), wettable powders (WPs), and water-dispersible granules (WDGs). The formulations that it is possible to use depend on the physical form of the agricultural product (for example solid or liquid) and on its physicochemical properties in the presence of other compounds, for instance water or solvents.

According to one embodiment, the agricultural active agent may be a water-soluble active agent, for example selected from:

glyphosate, in the form of its isopropylamine salt or of its sodium salt, gluphosinate, in the form of its ammonium salt.

2,4-D, in the form of its hydroxy-2-ethylammonium, dimethylammonium or tris(hydroxy-2-ethylammonium) salts, 2,4-DES, in the form of its sodium salt, guazatine, in the form of its triacetate, MCPA, in the form of its sodium, potassium or dimethylammonium salts, mecoprop, in the form of its sodium or potassium salts, acifluorfen, in the form of its sodium or potassium salts.

clopyralid, in the form of its hydroxy-2-ethylammonium or potassium salts,

MSMA, in the form of its sodium salt, paraquat, in the form of its dichloride or of its di(methylsulfate).

According to another of its aspects, a subject of the present invention is a suspension comprising:

an aqueous medium.

a monovalent salt;

a compound in the form of solid particles having a diameter of between 100 mm and 1 mm (preferably between 1 and 500 μm, more preferably between 5 and 100 μm);

a suspending agent consisting of a polymer comprising carboxylated groups, in particular a polysaccharide comprising carboxylated groups.

Advantageously, the suspending agent is an alginate, in particular selected from sodium alginate and ammonium alginate.

The monovalent salt is, in particular, selected from the salts containing the elements N, P, K and preferably selected from the following compounds: ammonium sulfate, ammonium polyphosphate, ammonium propionate, ammonium nitrate, ammonium phosphate, ammonium dihydrogen phosphate, ammonium hexametaphosphate, tetrapotassium pyrophosphate, urea, potassium phosphate, sodium carbonate, potassium sulfate, and mixtures thereof.

Preferably, the monovalent cation salt is an ammonium salt, preferably ammonium sulfate.

According to one embodiment, the compound in the form of solid particles is in particular of synthetic polymeric type (such as polyacrylamide or polyvinylpyrrolidone) or natural polymeric type (such as galactomannan, in particular guar and derivatives thereof, in particular neutral or native guar and hydroxyproxylated derivatives thereof). The invention will presently be illustrated by means of examples of suspensions in accordance with the invention.

IMPLEMENTATION EXAMPLES

Example 1

Formulation A

Protocol:

1000 g of the following formulation are prepared in a 2 l Schott Duran beaker (diameter ~12 cm, height ~23 cm). The deionized water is mixed with the Kathon® CG and the Silcolapse® RG22. The solution is stirred using a deflocculating paddle (diameter 80 mm) at a speed of 300 rpm for 5 minutes. The sodium alginate (in powder form) is then added and the formulation is stirred for 45 minutes to 1 hour at a speed of between 500 and 700 rpm. When the alginate has completely dissolved, the ammonium sulfate (in the form of crystals) is added at 500 rpm and the stirring is maintained for a further 45 minutes to 1 hour. To finish, the Jaguar® HP-120 (in powder form) is dispersed for 30 minutes at 600 rpm until a homogeneous formulation no longer containing any bubbles is obtained.

| Formulation A | Weight composition (g) | Weight percentage | Supplier |
|---|---|---|---|
| Deionized water | 575.9 | 57.59 | — |
| Ammonium sulfate | 376.0 | 37.60 | BASF |
| Jaguar ® HP-120* | 25.0 | 2.50 | Solvay(Rhodia) |
| Sodium alginate | 8.0 | 0.80 | Faravelli |
| Silcolapse ® RG 22** | 15.0 | 1.50 | Bluestar |
| Kathon ® CG*** | 0.1 | 0.01 | Brenntag |
| Total | 1000 | 100 | |

*Jaguar ® HP-120: guar gum, 2-hydroxypropyl ether
**Silcolapse ® RG 22: silicone-based antifoam emulsion
***Kathon ® CG: isothazolinone-based preservative Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 0% |
| Viscosity (cP) at 20 rpm and at 20° C. (ref: CIPAC MT 192) | 1000-1300 | 1000-1300 | 600-900 |
| Flowability | Readily flowable to at least −10° C. | | |
| pH (5% in distilled water) (ref: CIPAC MT 191 or MT 75.3 | 5-7 | | |
| Density | 1.225 ± 0.002 | | |

| Times and observations | CIPAC waters* (ref: adaptation of MT180) | | | | | |
|---|---|---|---|---|---|---|
| | A | D | A | D | A | D |
| Dilution stability (2.7% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Slight guar concentration gradient | | | | |

*CIPAC (Collaborate International Pesticides Analytical Council) waters: CIPAC water A has a hardness of 20 ppm, whereas that of CIPAC water D is 342 ppm The sodium alginate-based formulation is therefore perfectly stable at all the storage temperatures and very readily flowable. Furthermore, its dispersion in water is easy and good until at least 2 hours.

Comparative Formulation C1:

Protocol:

When the formulation of example 1 is prepared while scrupulously adhering to the same protocol but omitting the addition of sodium alginate, the composition of the formulation becomes the following:

| Formulation C1 | Weight composition (g) | Weight percentage |
|---|---|---|
| Deionized water | 575.9 | 58.06 |
| Ammonium sulfate | 376.0 | 37.90 |
| Jaguar ® HP-120 | 25.0 | 2.52 |
| Sodium alginate | 0 | 0 |
| Silcolapse ® RG 22 | 15.0 | 1.51 |
| Kathon ® CG | 0.1 | 0.01 |
| Total | 992 | 100 |

Results after Storage:

| Storage | 30 min at ambient temperature |
|---|---|
| Phase separation (ref: CIPAC MT 39.3 and MT 46.3) | Guar predominantly at the surface on approximately 10-20% + traces of guar at the bottom |

After a few minutes of storage at ambient temperature, a phase separation is observed subsequent to the guar rising to the surface. Furthermore, small amounts of guar are also found on the walls of the storage flask, predominantly at the bottom. The formulation is not stable. Since this formulation is not acceptable from a commercial point of view, there is no need to carry out additional tests.

Comparative Formulation C2:

Protocol:

When the formulation of example 1 is prepared while scrupulously adhering to the same protocol but replacing the sodium alginate with Rhodopol® 23 (in powder form), the composition of the formulation becomes the following:

| Formulation C2 | Weight composition (g) | Weight percentage |
|---|---|---|
| Deionized water | 575.9 | 57.59 |
| Ammonium sulfate | 376.0 | 37.60 |
| Jaguar ® HP-120 | 25.0 | 2.50 |
| Rhodopol ® 23* | 8.0 | 0.80 |

-continued

| Formulation C2 | Weight composition (g) | Weight percentage |
|---|---|---|
| Silcolapse ® RG 22 | 15.0 | 1.50 |
| Kathon ® CG | 0.1 | 0.01 |
| Total | 1000 | 100 |

*Rhodopol ® 23 is a xanthan gum sold by Solvay(Rhodia)

Results after Storage:

| Storage | 30 min at ambient temperature |
|---|---|
| Phase separation (ref: CIPAC MT 39.3 and MT 46.3) | Nonhomogeneous formulation with large pieces of gel (precipitated xanthan gum) which flow throughout the volume + these pieces of gel rise, leaving approximately 10% of water at the bottom of the flask |

The addition of AMS results in precipitation of the Rhodopol® 23 from the solution. Consequently, the Rhodopol® 23 no longer acts as a rheological thickener and the formulation is not stable. It is impossible to measure the viscosity because of the nonhomogeneity of the mixture.

Since this formulation is not acceptable from a commercial point of view, there is no need to carry out additional tests.

In conclusion, the tests above show that the addition of sodium alginate made it possible to stabilize a formulation rich in ammonium sulfate and containing guar particles. The suspension obtained in example 1 is homogeneous and exhibits neither phase separation nor precipitation.

Example 2

Formulation B

Protocol:

1700 g of the following formulation are prepared in a 2 l Pyrex beaker (diameter ~12.5 cm, height ~18 cm). The deionized water is stirred using a deflocculating paddle having a diameter of 7.7 cm, at a speed of 180 rpm for 5 minutes. The sodium alginate in powder form is then added and the formulation is stirred at a speed of 500 rpm for 30 minutes and then at a speed of 700 rpm for 30 minutes. When the alginate has completely dissolved, the ammonium sulfate (in the form of crystals) is added and the whole mixture is stirred at a speed of 700 rpm for 25 minutes. The Silcolapse RG22 is then added, the stirring speed is not modified. Finally, five minutes later, the Jaguar HP-120 (in powder form) is dispersed for 30 minutes at a speed of 700 rpm until a homogeneous formulation no longer containing any bubbles is obtained.

| Formulation B | Weight composition (g) | Weight percentage | Supplier |
|---|---|---|---|
| Deionized water | 576.0 | 57.60 | — |
| Ammonium sulfate | 376.0 | 37.60 | Quaron |
| Jaguar ® HP-120* | 25.0 | 2.50 | Solvay(Rhodia) |

-continued

| Formulation B | Weight composition (g) | Weight percentage | Supplier |
|---|---|---|---|
| Sodium alginate | 8.0 | 0.80 | Faravelli |
| Silcolapse ® RG 22** | 15.0 | 1.50 | Bluestar |
| Total | 1000 | 100 | |

*Jaguar ® HP-120: guar gum, 2-hydroxypropyl ether
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 0% |
| Viscosity (cP) at 20 rpm and at 20° C. (ref: CIPAC MT 192) | 400-800 | 1500-1800 | 600-900 |
| Flowability | Readily flowable to at least −10° C. | | |
| pH (5% in distilled water) (ref: CIPAC MT 191 or MT 75.3 | 5-7 | | |
| Density | 1.23 ± 0.01 | | |

| Times and observations | | CIPAC waters* (ref: adaptation of MT180) | | | | |
|---|---|---|---|---|---|---|
| | | A | D | A | D | A | D |
| Dilution stability (2.7% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Slight guar concentration gradient | | | | |

*CIPAC (Collaborate International Pesticides Analytical Council) waters: CIPAC water A has a hardness of 20 ppm, whereas that of CIPAC water D is 342 ppm The sodium alginate-based formulation is therefore perfectly stable at all the storage temperatures and very readily flowable. Furthermore, its dispersion in water is easy and good until at least 2 hours.

Comparative Formulations C3 and C4

| Manipulation | C3 | C4 | B |
|---|---|---|---|
| Ammonium sulfate (%) | 37.60 | 37.60 | 37.6 |
| Sodium alginate (%) | 0.4 | 2.5 | 0.8 |
| JaguarHP120(%) | 2.5 | 2.5 | 2.5 |
| Silcolapse RG22(%) | 1.5 | 1.5 | 1.5 |
| Purified water (%) | 58 | 55.9 | 57.6 |

Protocol:

C3: 100 g of the following formulation are prepared in a 250 ml VWR plastic beaker (diameter ~6 cm at the bottom and 9.3 cm at the top, height ~9 cm). The deionized water is stirred using a deflocculating paddle having a diameter of 5.4 cm, at a speed of 180 rpm for 5 minutes. The sodium alginate in powder form is then added and the formulation is stirred at a speed of 300 rpm for 10 minutes. When the alginate has completely dissolved, the ammonium sulfate (in the form of crystals) is added and the whole mixture is stirred at a speed of 300 rpm for 5 minutes. The Silcolapse RG22 is then added, the stirring speed is not modified. Finally, five minutes later, the Jaguar HP-120 (in powder form) is dispersed for 10 minutes at a speed of 450 rpm until a homogeneous formulation no longer containing any bubbles is obtained.

C4: 100 g of the following formulation are prepared in a 250 ml borosilicate glass beaker (diameter ~5.8, height ~12 cm). The deionized water is stirred using a deflocculating paddle having a diameter of 3.5 cm, at a speed of 180 rpm for 5 minutes. The sodium alginate in powder form is then added and the formulation is stirred at a speed of 450 rpm for 10 minutes and then at a speed of 600 rpm for 30 minutes. When the alginate has completely dissolved, the ammonium sulfate (in the form of crystals) is added and the whole mixture is stirred at a speed of 600 rpm for 10 minutes. The Silcolapse RG22 is then added, the stirring speed is not modified. Finally, five minutes later, the Jaguar HP-120 (in powder form) is dispersed for 10 minutes at a speed of 600 rpm until a homogeneous formulation no longer containing any bubbles is obtained.

Results:

C3: After 19 hours at ambient temperature, all the guar has sedimented. A few particles are in suspension and at the surface. After 19 hours at 54° C., all the guar has sedimented. A few particles are in suspension and at the surface.
C4: After hydration of the alginate, a very viscous paste which flows with difficulty is obtained. Since the other constituents are only solids except the antifoam, the formulation becomes difficult to mix and the final result is virtually unflowable. The formulation has a viscosity greater than 25 000 cps at ambient temperature.

Example 3

Formulation C

Protocol:

700 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 450 rpm for 15 minutes and then at a speed of 600 rpm for 20 to 25 minutes. When the alginate has completely dissolved, the ammonium sulfate (in the form of crystals) is added and the whole mixture is stirred at a speed of 400 to 450 rpm for 15 to 20 minutes. The Silcolapse RG22 is then added, the stirring speed is not modified. Five minutes later, the surfactant (Rhodasurf ID-5 in liquid form) is added and then the formulation is stirred without modifying the stirring speed. Finally, the Jaguar HP-120 (in powder form) is dispersed for 10 to 20 minutes at a speed of between 500 and 600 rpm until a homogeneous formulation no longer containing any bubbles is obtained.

| Formulation C | Weight composition (g) | Weight percentage | Supplier |
|---|---|---|---|
| Deionized water | 525.5 | 52.55 | — |
| Ammonium sulfate | 333.0 | 33.30 | Quaron |
| Jaguar ® HP-120* | 75.0 | 7.50 | Solvay(Rhodia) |
| Sodium alginate | 6.5 | 0.65 | Faravelli |
| Silcolapse ® RG 22** | 15.0 | 1.50 | Bluestar |
| Rhodasurf ID-5*** | 45.0 | 4.5 | Solvay(Rhodia) |
| Total | 1000 | 100 | |

*Jaguar ® HP-120: guar gum, 2-hydroxypropyl ether
**Silcolapse ® RG 22: silicone-based antifoam emulsion
***Rhodasurf ID-5: Alcohols, $C_{9-11}$ iso $C_{10}$ rich, ethoxylated After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 2.5% of separation at the bottom |
| Viscosity (cP) at 20 rpm and at 20° C. (ref: CIPAC MT 192) | 400-700 | 2000-2400 | 1000-1400 |
| Flowability | Readily flowable to at least −10° C. | | |
| pH (5% in distilled water) (ref: CIPAC MT 191 or MT 75.3 | 5-7 | | |

| | Times and observations | CIPAC waters* (ref: adaptation of MT180) | | | | | |
|---|---|---|---|---|---|---|---|
| | | A | D | A | D | A | D |
| Dilution stability (0.8% by weight) | 0 h at 30° C. | Flows at the bottom - No blooming - Not all is dispersed, a few particles fall to the bottom | | | | | |
| | 0.5 h at 30° C. | Acceptable - Marked guar concentration gradient. | | | | | |
| | 2 h at 30° C. | Acceptable - Marked guar concentration gradient | | | | | |

*CIPAC (Collaborate International Pesticides Analytical Council) waters: CIPAC water A has a hardness of 20 ppm, whereas that of CIPAC water D is 342 ppm Formulation D Protocol:

700 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 450 rpm for 15 minutes and then at a speed of 600 rpm for 20 to 25 minutes. When the alginate has completely dissolved, the ammonium sulfate (in the form of crystals) is added and the whole mixture is stirred at a speed of 400 to 450 rpm for 15 to 20 minutes. The Silcolapse RG22 is then added, the stirring speed is not modified. Five minutes later, the surfactant (Mirataine D40, in liquid form) is added and then the formulation is stirred without modifying the stirring speed. Finally, the Jaguar HP-120 (in powder form) is dispersed for 10 to 20 minutes at a speed of between 500 and 600 rpm until a homogeneous formulation no longer containing any bubbles is obtained.

| Formulation D | Weight composition (g) | Weight percentage | Supplier |
|---|---|---|---|
| Deionized water | 510.5 | 51.05 | — |
| Ammonium sulfate | 333.0 | 33.30 | Quaron |
| Jaguar ® HP-120* | 75.0 | 7.50 | Solvay(Rhodia) |
| Sodium alginate | 6.5 | 0.65 | Faravelli |
| Silcolapse ® RG 22** | 15.0 | 1.50 | Bluestar |
| Mirataine D40*** | 60.0 | 6 | Solvay(Rhodia) |
| Total | 1000 | 100 | |

*Jaguar ® HP-120: guar gum, 2-hydroxypropyl ether
**Silcolapse ® RG 22: silicone-based antifoam emulsion
***Mirataine D40: aqueous composition comprising water and an alkyldimethylbetaine, in which the alkyl group is a mixture of approximately 70% by weight of lauryl ($C_{12}$) and 30% by weight of tetradecyl ($C_{14}$), the composition having a solid alkyldimethylbetaine content of 40% by weight.

Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MF 39.3 and MT 46.3) | Homogeneous 0% | Homogeneous 0% | Homogeneous Traces of syneresis |
| Viscosity (cP) at 20 rpm and at 20° C. (ref: CIPAC MT 192) | 600-900 | 1500-1800 | 800-1100 |
| Flowability | Readily flowable to at least −10° C. | | |
| pH (5% in distilled water) (ref: CIPAC MT 191 or MT 75.3) | 5-7 | | |

| Times and observations | | CIPAC waters* (ref: adaptation of MT180) | | | | |
|---|---|---|---|---|---|---|
| | | A | D | A | D | A | D |
| Dilution stability (0.8% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Slight guar concentration gradient | | | | |

*CIPAC (Collaborate International Pesticides Analytical Council) waters: CIPAC water A has a hardness of 20 ppm, whereas that of CIPAC water D is 342 ppm Formulation E Protocol:

700 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 450 rpm for 15 minutes and then at a speed of 600 rpm for 20 to 25 minutes. When the alginate has completely dissolved, the ammonium sulfate (in the form of crystals) is added and the whole mixture is stirred at a speed of 400 to 450 rpm for 15 to 20 minutes. The Silcolapse RG22 is then added, the stirring speed is not modified. Five minutes later, the surfactant (Geronol CF/AR-E, in liquid form) is added and then the formulation is stirred without modifying the stirring speed. Finally, the Jaguar HP-120 (in powder form) is dispersed for 10 to 20 minutes at a speed of between 500 and 600 rpm until a homogeneous formulation no longer containing any bubbles is obtained.

| Formulation E | Weight composition (g) | Weight percentage | Supplier |
|---|---|---|---|
| Deionized water | 502.0 | 50.20 | — |
| Ammonium sulfate | 376.0 | 37.60 | Quaron |
| Jaguar ® HP-120* | 40 | 4 | Solvay(Rhodia) |
| Sodium alginate | 7.0 | 0.7 | Faravelli |
| Silcolapse ® RG 22** | 15.0 | 1.50 | Bluestar |
| Geronol CF/AR-E*** | 60.0 | 6 | Solvay(Rhodia) |
| Total | 1000 | 100 | |

*Jaguar ® HP-120: guar gum, 2-hydroxypropyl ether
**Silcolapse ® RG 22: Silicone-based antifoam emulsion
***Geronol CF/AR-E: Alkylethoxyphosphate, amine salt Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 4% of separation at the bottom |
| Viscosity (cP) at 20 rpm and at 20° C. (ref: CIPAC MT 192) | 1100-1200 | 1400-1800 | 300-600 |
| Flowability | Readily flowable to at least −10° C. | | |
| pH (5% in distilled water) (ref: CIPAC MT 191 or MT 75.3) | 5-7 | | |

| Times and observations | | CIPAC waters* (ref: adaptation of MT180) | | | | |
|---|---|---|---|---|---|---|
| | | A | D | A | D | A | D |
| Dilution stability (1.5% by weight) | 0 h at 30° C. | Flows at the bottom - No blooming - Good dispersion in 2 inversions | | | | |
| | 0.5 h at 30° C. | Very good | | | | |
| | 2 h at 30° C. | Very good | | | | |

*CIPAC (Collaborate International Pesticides Analytical Council) waters: CIPAC water A has a hardness of 20 ppm, whereas that of CIPAC water D is 342 ppm Example 4

Formulation F

Protocol:

700 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 500 rpm for 30 minutes. When the alginate has completely dissolved, the ammonium sulfate (in the form of crystals) is added and the whole mixture is stirred at a speed of 500 rpm for 20 minutes. The Silcolapse RG22 is then added, the stirring speed is not modified. Finally, five minutes later, the Jaguar HP-120 (in powder form) is dispersed for 20 minutes at a speed of 600 rpm until a homogeneous formulation no longer containing any bubbles is obtained.

| Formulation F | Weight composition (g) | Weight percentage | Supplier |
|---|---|---|---|
| Deionized water | 527.5 | 52.75 | — |
| Ammonium sulfate | 376.0 | 37.60 | Quaron |
| Jaguar ® HP-120* | 75.0 | 7.50 | Solvay(Rhodia) |
| Sodium alginate | 6.5 | 0.65 | Faravelli |
| Silcolapse ® RG 22** | 15.0 | 1.50 | Bluestar |
| Total | 1000 | 100 | |

*Jaguar ® HP-120: guar gum, 2-hydroxypropyl ether
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous Traces of separation at the bottom |
| Viscosity (cP) at 20 rpm and at 20° C. (ref: CIPAC MT 192) | 400-600 | 1500-1800 | 600 ± 900 |
| Flowability | | Readily flowable to at least −10° C. | |
| pH (5% in distilled water) (ref: CIPAC MT 191 or MT 75.3) | | 5-7 | |

| Times and observations | | CIPAC waters* (ref: adaptation of MT180) | | | | |
|---|---|---|---|---|---|---|
| | | A | D | A | D | A | D |
| Dilution stability (0.8% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Slight guar concentration gradient | | | | |

*CIPAC (Collaborate International Pesticides Analytical Council) waters: CIPAC water A has a hardness of 20 ppm, whereas that of CIPAC water D is 342 ppm Formulation G Protocol:

700 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 500 rpm for 20 minutes and then at a speed of 700) rpm for 2 hours. When the alginate has completely dissolved, the ammonium sulfate (in the form of crystals) is added and the whole mixture is stirred at a speed of 700 rpm for 40 minutes. The Silcolapse RG22 is then added, and the stirring speed is increased to 500 rpm. Finally, five minutes later, the Jaguar 308 NB (in powder form) is dispersed for 20 minutes at a speed of 700 rpm until a homogeneous formulation no longer containing any bubbles is obtained.

| Formulation G | Weight composition (g) | Weight percentage | Supplier |
|---|---|---|---|
| Deionized water | 576.0 | 57.60 | — |
| Ammonium sulfate | 376.0 | 37.60 | Quaron |
| Jaguar ® 308 NB* | 25.0 | 2.50 | Solvay(Rhodia) |
| Sodium alginate | 8.0 | 0.80 | Faravelli |
| Silcolapse ® RG 22** | 15.0 | 1.50 | Bluestar |
| Total | 1000 | 100 | |

*Jaguar ® 308 NB: guar gum
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 0% |
| Viscosity (cP) at 20 rpm and at 20° C. (ref: CIPAC MT 192) | 1000-1200 | 2400-2800 | 600-900 |
| pH (5% in distilled water) (ref: CIPAC MT 191 or MT 75.3) | | 5-7 | |

| Times and observations | | CIPAC waters* (ref: adaptation of MT180) | | | | |
|---|---|---|---|---|---|---|
| | | A | D | A | D | A | D |
| Dilution stability (2.7% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Guar concentration gradient | | | | |

*CIPAC (Collaborate International Pesticides Analytical Council) waters: CIPAC water A has a hardness of 20 ppm, whereas that of CIPAC water D is 342 ppm Formulation H Protocol:

100 g of the following formulation are prepared in a 250 ml beaker. The deionized water is stirred using a deflocculating paddle having a diameter of 5.5 cm, at a speed of 180 rpm for 5 minutes. The sodium alginate in powder form is then added and the formulation is stirred at a speed of 500 rpm for 30 minutes and then at a speed of 700 rpm for 30 minutes. When the alginate has completely dissolved, the ammonium sulfate (in the form of crystals) is added and the whole mixture is stirred at a speed of 700 rpm for 25 minutes. The Silcolapse RG22 is then added, the stirring speed is not modified. Finally, five minutes later, the Jaguar C162 (in powder form) is dispersed for 30 minutes at a speed of 700 rpm until a homogeneous formulation no longer containing any bubbles is obtained.

| Formulation H | Weight composition (g) | Weight percentage | Supplier |
|---|---|---|---|
| Deionized water | 57.6 | 57.60 | — |
| Ammonium sulfate | 37.6 | 37.60 | Quaron |
| Jaguar ® C162* | 2.5 | 2.50 | Solvay(Rhodia) |
| Sodium alginate | 0.8 | 0.80 | Faravelli |
| Silcolapse ® RG 22** | 1.5 | 1.50 | Bluestar |
| Total | 100 | 100 | |

*Jaguar ® C162: hydroxypropyl guar hydroxypropyltrimonium chloride (cationic guar)
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 0% |
| Viscosity (cP) at 20 rpm and at 20° C. (ref: CIPAC MT 192) | 1000-1400 | 1500-1900 | 400-800 |
| Flowability | Readily flowable to at least −5° C. | | |
| pH (5% in distilled water) (ref: CIPAC MT 191 or MT 75.3 | 6.0 | | |

| Times and observations | CIPAC waters* (ref: adaptation of MT180) | | | | | |
|---|---|---|---|---|---|---|
| | A | D | A | D | A | D |
| Dilution stability (2.7% by weight) | 0 h at 30° C. | Flows at the bottom - No blooming - Good dispersion in 3 inversions | | | | |
| | 0.5 h at 30° C. | Very good | | | | |
| | 2 h at 30° C. | Good - Slight guar concentration gradient | | | | |

*CIPAC (Collaborate International Pesticides Analytical Council) waters: CIPAC water A has a hardness of 20 ppm, whereas that of CIPAC water D is 342 ppm Formulation I Protocol:

100 g of the following formulation are prepared in a 250 ml beaker. The deionized water is stirred using a deflocculating paddle having a diameter of 5.5 cm, at a speed of 180 rpm for 5 minutes. The sodium alginate in powder form is then added and the formulation is stirred at a speed of 500 rpm for 30 minutes and then at a speed of 700 rpm for 30 minutes. When the alginate has completely dissolved, the ammonium sulfate (in the form of crystals) is added and the whole mixture is stirred at a speed of 700 rpm for 25 minutes. The Silcolapse RG22 is then added, the stirring speed is not modified. Finally, five minutes later, the CGEL 100 (in powder form) is dispersed for 30 minutes at a speed of 700 rpm until a homogeneous formulation no longer containing any bubbles is obtained (a few larger particles less well dispersed).

| Formulation I | Weight composition (g) | Weight percentage | Supplier |
|---|---|---|---|
| Deionized water | 57.6 | 57.60 | — |
| Ammonium sulfate | 37.6 | 37.60 | Quaron |
| CGEL 100* | 2.5 | 2.50 | SNF Floerger |
| Sodium alginate | 0.8 | 0.80 | Faravelli |
| Silcolapse ® RG 22** | 1.5 | 1.50 | Bluestar |
| Total | 100 | 100 | |

*CGEL100: branched acrylamide/sodium acrylate copolymer
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homogeneous 0% | Homogeneous 0% | Homogeneous 0% |
| Viscosity (cP) at 20 rpm and at 20° C. (ref: CIPAC MT 192) | 1800-2200 | 1200-1600 | 1200-1600 |
| Flowability | Readily flowable to at least 0° C. | | |
| pH (5% in distilled water) (ref: CIPAC MT 191 or MT 75.3 | 5.4 | | |

| Times and observations | CIPAC waters* (ref: adaptation of MT180) | | | | | |
|---|---|---|---|---|---|---|
| | A | D | A | D | A | D |
| Dilution stability (2.7% by weight) | 0 h at 30° C. | Flows at the bottom - No blooming - Good dispersion in 2 inversions | | | | |
| | 0.5 h at 30° C. | Very good | | | | |
| | 2 h at 30° C. | Good - Very slight deposit | | | | |

*CIPAC (Collaborate International Pesticides Analytical Council) waters: CIPAC water A has a hardness of 20 ppm, whereas that of CIPAC water D is 342 ppm Formulation J Protocol:

100 g of the following formulation are prepared in a 250 ml beaker. The deionized water is stirred using a deflocculating paddle having a diameter of 5.5 cm, at a speed of 180 rpm for 5 minutes. The sodium alginate in powder form is then added and the formulation is stirred at a speed of 500 rpm for 30 minutes and then at a speed of 700 rpm for 30 minutes. When the alginate has completely dissolved, the ammonium sulfate (in the form of crystals) is added and the whole mixture is stirred at a speed of 700 rpm for 25 minutes. The Silcolapse RG22 is then added, the stirring speed is not modified. Finally, five minutes later, the CGEL 100 (in powder form) is dispersed for 30 minutes at a speed of 700 rpm until a homogeneous formulation no longer containing any bubbles is obtained

| Formulation J | Weight composition (g) | Weight percentage | Supplier |
|---|---|---|---|
| Deionized water | 57.6 | 57.60 | — |
| Ammonium sulfate | 37.6 | 37.60 | Quaron |
| Natrosol (type 250HR)* | 2.5 | 2.50 | Ashland |
| Sodium alginate | 0.8 | 0.80 | Faravelli |
| Silcolapse ® RG 22** | 1.5 | 1.50 | Bluestar |
| Total | 100 | 100 | |

*Natrosol: hydroxyethylcellulose
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homo-geneous 0% | Homo-geneous 0% | Homogeneous 0% |
| Viscosity (cP) at 20 rpm and at 20° C. (ref: CIPAC MT 192) | 1200-1600 | 700-1000 | 350-650 |
| Flowability pH (5% in distilled water) (ref: CIPAC MT 191 or MT 75.3) | | Readily flowable to at least −5° C. 5.5 | |

| Times and observations | CIPAC waters* (ref: adaptation of MT180) | | | | | |
|---|---|---|---|---|---|---|
| | A | D | A | D | A | D |
| Dilution stability (2.7% by weight) 0 h at 30° C. 0.5 h at 30° C. 2 h at 30° C. | | Flows at the bottom - No blooming - Good dispersion in 3 inversions Acceptable (subject to stirring) Acceptable (subject to stirring) | | | | |

*CIPAC (Collaborate International Pesticides Analytical Council) waters: CIPAC water A has a hardness of 20 ppm, whereas that of CIPAC water D is 342 ppm Example 5

Formulation K

Protocol:

500 g of the following formulation are prepared in a 1 l VWR plastic beaker (diameter ~8.9 cm at the bottom and 11.4 cm at the top, height ~14.5 cm). The deionized water is stirred using a deflocculating paddle having a diameter of 7.7 cm, at a speed of 180 rpm for 5 minutes. The sodium alginate in powder form is then added and the formulation is stirred at a speed of 450 rpm for 1 h and 20 minutes. When the alginate has completely dissolved, the ammonium sulfate (in the form of crystals) is added and the whole mixture is stirred at a speed of 450 rpm for 1 hour. The Silcolapse RG22 is then added, and the stirring speed is increased to 500 rpm. Finally, five minutes later, the Jaguar HP-120 (in powder form) is dispersed for 50 minutes at a speed of 500 rpm until a homogeneous formulation no longer containing any bubbles is obtained.

| Formulation K | Weight composition (g) | Weight percentage | Supplier |
|---|---|---|---|
| Deionized water | 558.0 | 55.80 | — |
| Ammonium sulfate | 394.0 | 39.40 | Quaron |
| Jaguar ® HP-120* | 25.0 | 2.50 | Solvay(Rhodia) |
| Sodium alginate | 8.0 | 0.80 | Faravelli |
| Silcolapse ® RG 22** | 15.0 | 1.50 | Bluestar |
| Total | 1000 | 100 | |

*Jaguar ® HP-120: guar gum, 2-hydroxypropyl ether
**Silcolapse ® RG 22: silicone-based antifoam emulsion Results:

After storage of this formulation, the results are presented in the following table:

| Storage | 7 days at 0° C. | 14 days at ambient temperature | 14 days at 54° C. |
|---|---|---|---|
| Phase separation (ref: CIPAC MT 39.3 and MT 46.3) | Homo-geneous 0% | Homo-geneous 0% | Homogeneous 0% |
| Viscosity (cP) at 20 rpm and at 20° C. (ref: CIPAC MT 192) | 1300-1400 | 1900-2100 | 1300-1500 |
| Flowability pH (5% in distilled water) (ref: CIPAC MT 191 or MT 75.3) | | Readily flowable to at least −10° C. 5-7 | |

| Times and observations | CIPAC waters* (ref: adaptation of MT180) | | | | | |
|---|---|---|---|---|---|---|
| | A | D | A | D | A | D |
| Dilution stability (2.7% by weight) 0 h at 30° C. 0.5 h at 30° C. 2 h at 30° C. | | Flows at the bottom - No blooming - Good dispersion in 2 inversions Very good Good - Very slight guar concentration gradient | | | | |

*CIPAC (Collaborate International Pesticides Analytical Council) waters: CIPAC water A has a hardness of 20 ppm, whereas that of CIPAC water D is 342 ppm

The invention claimed is:

1. An agricultural composition comprising a suspension of a polymer, the suspension comprising:
   at least 2% by weight of the polymer that is a galactomannan selected from the group consisting of a hydroxypropyl guar, a carboxymethylhydroxypropyl guar, a cationic hydroxyalkyl guar, a neutral hydroxyalkyl guar, a carboxyalkyl guar, a hydroxyethylated guaran derivative, a hydroxypropylated guaran derivative, a carboxymethylated carubin derivative, a hydroxypropylated *cassia* gum derivative, a carboxymethylated *cassia* gum derivative, and mixtures thereof, based on the total weight of the suspension;
   a liquid medium that is a single-phase aqueous medium that contains more than 10 parts by weight of water relative to 100 parts by weight of the aqueous medium;
   30% to 60% by weight of ammonium sulfate, based on the total weight of the suspension;
   0.5% to 1.5% by weight of an alginate that is one or more selected from the group consisting of sodium alginate and ammonium alginate, based on the total weight of the suspension; and
   one or more other additive selected from the group consisting of a preservative, an antifoam, a humectant, and a surfactant,
   wherein the weight ratio between the ammonium sulfate and the galactomannan is between 100 and 4.

2. The agricultural composition according to claim 1, wherein the ammonium sulfate content is greater than or equal to 31% by weight relative to the total weight of the suspension.

3. The agricultural composition according to claim 1, wherein:
   the galactomannan is in the form of solid particles having a diameter of between 100 nm and 1 mm.

4. The agricultural composition according to claim 1 intended to be applied to a field as an extemporaneous adjuvant.

5. The agricultural composition according to claim 1, wherein the galactomannan is a guar derivative.

6. The agricultural composition according to claim 1 comprising from 31% by weight to 60% by weight of the ammonium sulfate.

7. The agricultural composition according to claim 1 comprising from 31% by weight to 40% by weight of the ammonium sulfate.

8. The agricultural composition according to claim 1, wherein when the galactomannan is the cationic hydroxyalkyl guar, the cationic hydroxyalkyl guar is selected from cationic hydroxyethyl guar, cationic hydroxypropyl guar, cationic hydroxybutyl guar, and mixtures thereof.

9. The agricultural composition according to claim 1, wherein when the galactomannan is the neutral hydroxyalkyl guar, the neutral hydroxyalkyl guar is selected from neutral hydroxyethyl guar, neutral hydroxypropyl guar, neutral hydroxybutyl guar, and mixtures thereof.

10. The agricultural composition according to claim 1, wherein when the galactomannan is the carboxyalkyl guar, the carboxyalkyl guar is one or more selected from the group consisting of carboxymethyl guar, carboxylpropyl guar, and carboxybutyl guar.

11. The agricultural composition according to claim 1, wherein the galactomannan is selected from the group consisting of hydroxypropyltrimethylammonium guar, hydroxypropyllauryldimethylammonium guar, hydroxypropylstearyldimethylammonium guar, hydroxypropyl guar, carboxymethyl guar, guar with hydroxypropyl and hydroxypropyltrimethylammonium groups, carboxymethylhydroxypropyl guar, and mixtures thereof.

12. The agricultural composition according to claim 1, wherein the antifoam is a silicone-based antifoam.

13. The agricultural composition according to claim 1, wherein the alginate is from 0.5% to 2% by weight based on the total weight of the suspension.

14. The agricultural composition according to claim 1, wherein the alginate is sodium alginate.

15. The agricultural composition according to claim 1, wherein the alginate is ammonium alginate.

* * * * *